United States Patent
England et al.

(10) Patent No.: US 7,403,268 B2
(45) Date of Patent: Jul. 22, 2008

(54) METHOD AND APPARATUS FOR DETERMINING THE GEOMETRIC CORRESPONDENCE BETWEEN MULTIPLE 3D RANGEFINDER DATA SETS

(75) Inventors: James N. England, Chapel Hill, NC (US); Aron T. Helser, Chapel Hill, NC (US); Benjamin C. Elgin, Hillsborough, NC (US); Richard L. Holloway, Chapel Hill, NC (US)

(73) Assignee: Deltasphere, Inc., Chapel Hill, NC (US)

( * ) Notice: Subject to any disclaimer, the term of this patent is extended or adjusted under 35 U.S.C. 154(b) by 0 days.

(21) Appl. No.: 11/351,235

(22) Filed: Feb. 9, 2006

(65) Prior Publication Data

US 2006/0193179 A1 Aug. 31, 2006

Related U.S. Application Data

(60) Provisional application No. 60/652,208, filed on Feb. 11, 2005.

(51) Int. Cl.
*G01C 3/08* (2006.01)
(52) U.S. Cl. ..................................... 356/4.01
(58) Field of Classification Search ....... 365/3.01–3.15, 365/4.01–4.1, 5.01–5.15, 6–22, 28, 28.5
See application file for complete search history.

(56) References Cited

U.S. PATENT DOCUMENTS

| 5,309,212 | A | 5/1994 | Clark |
| 5,715,166 | A | 2/1998 | Besl |
| 5,988,862 | A | 11/1999 | Kacyra |
| 6,915,008 | B2 * | 7/2005 | Barman et al. ............... 382/154 |
| 6,922,234 | B2 | 7/2005 | Hoffman |
| 6,980,690 | B1 * | 12/2005 | Taylor et al. ................. 382/154 |

OTHER PUBLICATIONS

Acuity Research, "AccuRange 4000, Accurange High Speed Interface, Accurange Line Scanner User's Manual", product manual, Dec. 15, 1999, Menlo Park CA.
Acuity Research, "AccuRange 4000 laser rangefinder", product literature, URL http://www.acuityresearch.com/pdf/ar4000-datasheet.pdf, Feb. 10, 2005.

(Continued)

*Primary Examiner*—Thomas H. Tarcza
*Assistant Examiner*—Luke D Ratcliffe
(74) *Attorney, Agent, or Firm*—Jenkins, Wilson, Taylor & Hunt, P.A.

(57) ABSTRACT

A method, computer program product, and apparatus for obtaining the geometric correspondence between at least two 3D range data sets obtained using a 3D rangefinder device. First and second 3D range data sets are provided. The first 3D range data set is displayed as a 2D displayed image. The second 3D range data set is displayed as one of a second 2D displayed image and a 3D displayed image. Corresponding features within the first 2D displayed image and within the second displayed image are respectively specified. A 3D transformation between the first 3D range data set and the second 3D range data set is computed based on the geometry of the specified corresponding features. As such, that the geometric correspondence between the two 3D range data sets may be determined.

25 Claims, 8 Drawing Sheets
(2 of 8 Drawing Sheet(s) Filed in Color)

OTHER PUBLICATIONS

Leica Geosystems, "Leica Cyclone 5.4 Technical Specifications", product literature, URL http://www.leica-geosystems.com/hds/en/Cyclone_5.4_Technical_Specifications.pdf, Mar. 15, 2006.

3rdTech Inc, "DeltaSphere 3000 Laser 3D Scene Digitizer", product literature, Jun. 22, 2000.

3rdTech Inc, "Revolutionary 3D Scene Capture, Viewing and Analysis", product literature, URL http://www.deltasphere.com/images/deltaspheredatasheet_112204s.pdf, Nov. 22, 2004.

Nyland et al., "Capturing, Processing and Rendering Real-World Scenes", Videometerics and Optical Methods for 3D Shape Measurement, Electronic Imaging 2001, Photonics West, SPIE vol. 4309 Jan. 22, 2001.

Canesta Inc., "Development Platform DP100", Jun. 26, 2003.

Canesta Inc., "CanestaVision Chips", URL http:///www.canesta.com/html/sensors.htm, 2006.

Gokturk et al., "A Time-of-Flight Depth Sensor—System Description, Issues and Solutions" 2004 Conference on Computer Vision and Pattern Recognition Workshop (CVPRW04) vol. 3.

Tsai, "An Efficient and Accurate Camera Calibration Technique for 3D Machine Vision", Proceedings of IEEE Conference on Computer Vision and Pattern Recognition, Miami Beach, FL, pp. 364-374, 1986.

Turk et al., "Zippered polygon meshes from range images", Computer Graphics, ACM Siggraph 94 Proceedings, Orlando, Fla., pp. 311-318, 1994.

Innovmetric Inc., "PolyWorks Total Point Cloud Inspection and Reverse-Engineering Software Solution", product literature, URL http://www.innovmetric.com/Manufacturing/pdf/brochureWeb.pdf, 2003.

Besl et al., "A Method for Registration of 3-D Shapes", IEEE Transactions on Pattern Analysis and Machine Intelligence, vol. 14 (1992), No. 2, 239-256.

Bernardini et al., "The 3D Model Acquisition Pipeline" vol. 21 (2002), No. 2 pp. 149-172, Computer Graphics forum.

Faugeras et al., "The representation, recognition, and locating of 3-d objects", International Journal of Robotic Research, 5(3):27-52, Fall 1986.

Arun et al., "Least-Squares Fitting of Two 3D Point Sets", in IEEE Transactions on Pattern Analysis and Machine Intelligence, vol. 9 (1987), 698-700.

Acuity Research, "Accurange Line Scanner", product literature, URL http://www.acuityresearch.com/pdf/line-scanner-data-sheet.pdf, Oct. 17, 2005.

3rdTech Inc., "SceneVision-3D Functions", product literature, URL http://www.deltasphere.com/scenevision_specs.htm, Feb. 28, 2006.

* cited by examiner

METHOD AND APPARATUS FOR DETERMINING THE GEOMETRIC CORRESPONDENCE BETWEEN MULTIPLE 3D RANGEFINDER DATA SETS

CROSS REFERENCE TO RELATED APPLICATIONS

This patent application claims the benefit of U.S. provisional application Ser. No. 60/652,208 filed Feb. 11, 2005, the entire contents of which are incorporated by reference herein.

FIELD OF THE INVENTION

The present invention relates to 3D rangefinder processing technology generally, and more particularly relates to methods, computer program products, and apparatus for determining the geometric correspondence between at least two 3D rangefinder data sets and using same.

BACKGROUND OF THE INVENTION

A rangefinder is a device for measuring the range from the device to some physical surface. A laser rangefinder can be one of many known types of rangefinders. Laser rangefinders are sometimes known as LIDAR (Light Detection and Ranging) or LADAR (Laser Detection and Ranging) systems. Laser rangefinders use a variety of techniques to measure the range from the apparatus to a surface from which the laser beam is reflected. A typical apparatus may in some manner measure the round trip time-of-flight of the beam from the apparatus's emitter to the target, or the reflector, and back to the apparatus's receiver. One such apparatus is generally commercially available from Acuity Research and known as the AR4000 laser rangefinder, which can be found at URL http://www.acuityresearch.com, for example. Information on example laser rangefinder technology can be found in U.S. Pat. No. 5,309,212 which describes establishing an oscillator whose frequency is dependent on the time-of-flight of the laser beam and then measuring the time period of that oscillator. Since the speed of light is known, this time period measurement can then be readily converted to indicate the range from the apparatus to a surface that reflects the laser beam. A digital interface to a computer is typically included in such rangefinders. Other examples of laser and other rangefinders can be found in the text "Sensors for Mobile Robots: Theory and Application" by H. R. Everett (A.K. Peters, Ltd., 1995).

A rangefinder's laser beam may be directed in various directions by physically pointing the apparatus, by using one or more moving mirrors or prisms under manual or computer control, or both. A common configuration scans the beam in one plane and is called a line scanner, such as that sold commercially by Acuity Research and found at their website, for example. This apparatus includes a laser rangefinder that directs the beam end-on toward a rotating 45-degree mirror. The beam is thus turned at 90 degrees and sweeps out an arc as the 45-degree mirror rotates. The resulting data is a set of range data points representing the profile of an object or space. For example, if the scanned beam is directed at an automobile, a set of data points representing a profile of the automobile is produced.

The rangefinder's laser beam may also be directed to scan in two dimensions by physically pointing the apparatus, by using one or more moving mirrors or prisms, or both. As such the rangefinder's laser beam can thus acquire range measurements to a host of points within the environment. This type of apparatus is sometimes referred to as a scanning 3D laser rangefinder or just scanning laser rangefinder. In general, the three dimensions comprise two dimensions of scanning, such as X and Y, plus range or distance between the rangefinder and a point in space at which the laser beam is directed.

In order to acquire the range measurements to multiple points within an area, the rangefinder beam may be steered under manual or computer control. The steering may be accomplished directly through physical movement or optically through the use of mirrors or prisms. A scanning laser rangefinder sweeps the beam in two directions to cover an area. For example, a scanning laser rangefinder developed by Cyra Technologies Inc. sweeps the beam in an X, Y raster pattern through the use of mirrors. Information on the Cyra rangefinder technology is disclosed in U.S. Pat. No. 5,988,862. As a further example, we discuss the DeltaSphere 3000 laser scanner, such as 100 shown in FIG. 1. As seen, the laser scanner mounts on a tripod 105, includes a laser rangefinder 140, and is controlled by an embedded computer 150. The laser scanner sweeps the laser beam 110 in elevation using a rotating 45-degree mirror 120 and in azimuth by rotating 130 the laser and mirror assembly. Information on the DeltaSphere 3000 laser scanner product can be found at URL http://www.deltasphere.com. Further background on the technology for the DeltaSphere 3000 laser scanner can be found in "Capturing, Processing and Rendering Real-World Scenes", Videometrics and Optical Methods for 3D Shape Measurement, Electronic Imaging 2001, Photonics West, SPIE Vol. 4309 Jan. 22, 2001, an article by Lars Nyland, Anselmo Lastra, David K. McAllister, Voicu Popescu, and Chris McCue.

Other examples of scanning laser rangefinders can be found in "Sensors for Mobile Robots: Theory and Application" by H. R. Everett (A.K. Peters, Ltd., 1995). The results of these scans are 3D data sets sometimes referred to as "3D point clouds". Similar data is provided by a rangefinder array design, such as those made commercially by Canesta Inc., also known as a range camera, that enables measurement of multiple range points at once. Information may be found at URL http://www.canesta.com/.

Various 3D rangefinder technologies may collect data at various rates ranging from 1 sample per second to several hundred thousand samples per second, but all provide essentially the same results, an array of 3D points where at least the range, elevation, and azimuth for each point is known. This representation in spherical coordinates may easily be transformed to X, Y, Z values in Cartesian coordinates. The rate of collecting the data points determines the time required to capture the data in the field, but obviously has no impact on later processing and use of the data. It will be clear that the methods discussed in this invention are independent of the speed of capture of the original data and that the methods apply to all forms of 3D rangefinder devices.

3D data sets collected by a 3D rangefinder may be presented as a visual display to a user in several different ways. The visualization techniques fall broadly into two classes, 3D displayed images and 2D displayed images.

A 3D displayed image format is one in which the user may select a particular 3D viewpoint and then view the 3D range data as geometric figures in perspective projection or in orthogonal projection or via some other projection within a 2D computer image. Techniques for creating 3D displayed images are well known from computer graphics textbooks such as "Computer Graphics: Principles and Practice in C" by James D. Foley, Andries van Dam, Steven K. Feiner, and John F. Hughes (Addison Wesley 1995). Well-known formats for a 3D displayed image may have the 3D range data samples represented as 3D points (also known as a point cloud) in which the same color is assigned to all points, in which false color is assigned to each point based on its range, in which color is assigned to each point based on its reflectance intensity (strength of the signal returned from a surface to the 3D rangefinder), or in which points are colored via any other scheme. In another well-known 3D display technique, the 3D range data points may be linked together into a 3D mesh using well known computer graphics techniques, such that neighboring points are connected via lines within the display. The lines of the mesh may be colored using any of the techniques discussed above using well-known computer graphics techniques. In another 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may be determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

A 2D displayed image is one in which the 3D range data set is inherently represented as a 2D image. There are several well-known techniques for creating 2D displayed images since the data from a typical 3D rangefinder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as vertical or Y axis on the display, and each pixel represents one or more 3D data points depending on the scale chosen. Of course, the 2D displayed image need not be represented in spherical projection, but in any other well-known projection of a 3D data set to a 2D display. As illustrated in FIG. 2, for example, each pixel may have a multiplicity of associated values stored with it, including precise azimuth angle value 210, precise elevation angle value 220, range value 230, reflectance value 240, color 250 (RGB), and any other useful values 260. For example, a useful value might be some other attribute associated with the pixel. The color of each pixel within the 2D displayed image may be determined in any of a number of well-known formats. A Range Image has a false color assigned to each pixel based on its range. A Reflectance Image has a color assigned to each pixel based on the intensity of the reflected laser beam. A Registered Color Image has a color assigned to each pixel based on the color obtained from a color sensor such as a 2D digital camera such that the range data and color data are aligned as shown in FIG. 3. A Registered Color Image may typically be created by the steps of capturing a 3D range data set with a 3D rangefinder and displaying it as a Reflectance Image 310, capturing a 2D image using a calibrated digital color camera and displaying it as a 2D color image 320, identifying corresponding features between the two 2D images such as 311 and 321, 312 and 322, 313 and 323, and 314 and 324, using the locations of the corresponding features to compute the pose (location and orientation) of the 2D digital color camera, using the camera pose information to compute the optical path from the camera into the 3D data set, and applying the color from each pixel of the 2D color image to corresponding points of the 3D data set displayed as a 2D image. Using this method, the 3D range data and 2D color image need not have been acquired from the same viewpoint. Further information on the mathematics underlying the 2D image registration process may be found in an article by R. Y. Tsai, "An Efficient and Accurate Camera Calibration Technique for 3D Machine Vision", Proceedings of IEEE Conference on Computer Vision and Pattern Recognition, Miami Beach, Fla., pp. 364-374, 1986.

Examples of a Range Image, a Reflectance Image, and a Registered Color Image may be found in an article by Lars Nyland, Anselmo Lastra, David K. McAllister, Voicu Popescu, and Chris McCue, titled "Capturing, Processing and Rendering Real-World Scenes", Videometrics and Optical Methods for 3D Shape Measurement, Electronic Imaging 2001, Photonics West, SPIE Vol. 4309 Jan. 22, 2001. The ability to create and display a Range Image, a Reflectance Image, and a Registered Color Image has been available in the DsControl, DsColor, and other software provided to DeltaSphere 3000 customers beginning some time ago.

When the 3D data set is displayed in any of the above formats, it is a well-known technique for a user to interactively select a particular pixel on the screen and to determine the X, Y, Z coordinates of the data represented at that pixel. In 2D displayed images, for example, the ability to select and display the X, Y, Z coordinates for any point in a Range Image, a Reflectance Image, and a Registered Color Image has been available in the DsControl and other software provided to DeltaSphere 3000 customers beginning some time ago. For 3D displayed images, commonly used computer graphics and computer-aided design software packages have enabled a user to pick a point, a point on a mesh, or a point on a surface and determine the X, Y, Z coordinates of that point. As another example, U.S. Pat. No. 6,922,234 discloses methods of making measurements within a reflectance image obtained from a laser scanner which captures data at up to 125,000 points per second.

It is necessary at times to combine multiple laser rangefinder 3D range data sets. It is common practice using well-known techniques to cover a large area or object with multiple scans taken from different viewpoints and to then "stitch" or integrate these scans together into a single 3D model. This process is known as registration. One such method for registering 3D range sets together is disclosed in G. Turk and M. Levoy, "Zippered polygon meshes from range images", Computer Graphics, ACM Siggraph 94 Proc, Orlando, Fla., pp. 311-318, 1994.

Using registration, the geometric correspondence between the distinct 3D range data sets can be determined. As is well known from elementary computer graphics texts such as "Computer Graphics: Principles and Practice in C" by James D. Foley, Andries van Dam, Steven K. Feiner, and John F. Hughes (Addison Wesley 1995), a point in one 3D frame of reference can be transformed into the coordinates of a second frame of reference using a 3D rigid transformation comprising three rotation angles plus a 3D translation. The critical component of registration is the 3D transformation defining how to convert the 3D data points in one scan or 3D range data set into the 3D coordinate space of another 3D range data set. Also it may be desired to convert the 3D data points in one scan or 3D range data set into a separate common 3D coordinate space.

For example, suppose a 3D rangefinder is used to acquire a first 3D data set of a vehicle from a left front viewpoint and is then moved to acquire a second 3D data set from a left side viewpoint. If the 3D transformation between the two viewpoints is known, then both sets of 3D data may be easily combined into a single coordinate space and display and measurement using both data sets is facilitated.

Additional scans or 3D range data sets may then be added serially in like fashion, all to a common frame of reference. As such, the geometric correspondence between two or more 3D range data sets may be established. This is also known as registering two or more 3D range data sets. In the case of the vehicle example, 3D data sets might be acquired from the left front, left side, left rear, right rear, right side, and right front viewpoints and then all of these 3D data sets would be registered in order to create a single complete 3D model of the vehicle. Several existing software packages provide this capability—for example the PolyWorks software package from Innovmetric, such as described on the internet at URL http://www.innovmetric.com//includes a software tool called ImAlign.

In the Polyworks software package and others for example, the user is allowed to specify multiple pairs of corresponding points from two 3D range data sets and to either use those correspondences directly or as a starting point for an algorithm that refines the geometric correspondence such as that disclosed in P. J. Besl and N. D. McKay, "A Method for Registration of 3-D Shapes", IEEE Transactions on Pattern Analysis and Machine Intelligence, Vol. 14 (1992), No. 2, 239-256. Well-known mathematical techniques allow the calculation of the necessary scan-to-scan 3D transformation from multiple pairs of points. By simple linear algebra, three corresponding pairs of points are the minimum necessary to solve for the desired transformation matrix. Likewise, well known methods allow the transformation matrix to be solved by finding three corresponding planes. Additional references on registration techniques may be found in Fausto Bernardini and Holly Rushmeier, "The 3D Model Acquisition Pipeline" Volume 21 (2002), number 2 pp. 149-172 COMPUTER GRAPHICS forum.

In conventional registration methods, the user selects corresponding points from an orthogonal or perspective 3D display of sample points (as interactively displayed on a computer monitor). The user can rotate each 3D point cloud independently to obtain a useful view and then highlight or circle the corresponding points or areas. However, these 3D point displays may be confusing when there are many thousands or millions of points being displayed on the screen. It would be advantageous to be able to establish geometric correspondence using displays that are easier to work with. As such, user productivity would be increased, and new applications for 3D rangefinder technology could be enabled.

SUMMARY OF THE INVENTION

The present invention and its various embodiments seek to address at least some of the above needs and problems while attempting to deliver one or more of the above advantages. The present invention provides a number of embodiments that seek to allow a user to more effectively determine the geometric correspondence between two or more 3D rangefinder data sets. As such, the user can more productively register 3D range data sets and new applications could be served. The present invention provides methods, computer program products, and apparatuses for registering 3D range data sets in various embodiments.

In a first embodiment, the present invention provides a method for obtaining the geometric correspondence between at least two 3D range data sets obtained using a 3D rangefinder device. The method comprises at least a number of steps. The method starts by providing a first 3D range data set. Next, a second 3D range data set is provided. Of course, more 3D range data sets could be provided, either in parallel or serially. The method thereafter includes the step of representing the first 3D range data set as a first 2D displayed image. Further, the first 3D range data set could be represented as multiple 2D displayed images in different formats. Next, the method provides the step of representing the second 3D range data set as a second displayed image selected from the group consisting of a second 2D displayed image and a 3D displayed image. In addition, the method includes the step of specifying corresponding features within the first 2D displayed image and within the second displayed image respectively. The method also comprises the step of computing a 3D transformation between the first 3D range data set and the second 3D range data set based on the geometry of the specified corresponding features. As such, the geometric correspondence between the two 3D range data sets is determined. Various other embodiments related to the above are provided.

A second embodiment of the invention provides a computer program product stored in computer readable media for execution in at least one processor. The computer program product can be used for obtaining the geometric correspondence between at least two 3D range data sets. The 3D range data sets can be obtained by using a 3D rangefinder device. The computer program product comprises a number of software modules therein. A first software module for providing a first 3D range data set, and a second software module for providing a second 3D range data set are included in the computer program product. Further, a third software module for representing the first 3D range data set as a first 2D displayed image is provided. A fourth software module is included for representing the second 3D range data set as a second displayed image selected from the group consisting of a second 2D displayed image and a 3D displayed image. In addition, a fifth software module for specifying corresponding features within the first 2D displayed image and within the second displayed image respectively is provided. The computer program product also provides a sixth software module for computing a 3D transformation between the first 3D range data set and the second 3D range data set based on the geometry of the specified corresponding features. As such, the geometric correspondence between the two 3D range data sets is determined. The present invention also provides other embodiments related to the preceding.

The present invention provides an apparatus in a third embodiment. The apparatus may be used for obtaining the geometric correspondence between at least two 3D range data sets obtained using a 3D rangefinder device. At least one computer processor executing a computer program product within is provided by the apparatus. A number of software modules are included within the computer program product. Thus, a first software module for providing a first 3D range data set is provided. Also, a second software module for providing a second 3D range data set is included in the computer program product. In addition, a third software module is provided for representing the first 3D range data set as a first 2D displayed image. A fourth software module is included for representing the second 3D range data set as a second displayed image selected from the group consisting of a second 2D displayed image and a 3D displayed image. Further, a fifth software module for specifying corresponding features within the first 2D displayed image and within the second displayed image respectively is included. The computer program product also provides a sixth software module for computing a 3D transformation between the first 3D range data set and the second 3D range data set based on the geometry of the specified corresponding features. As such, the geometric correspondence between the two 3D range data sets is determined. The present invention also provides other embodiments related to the preceding.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
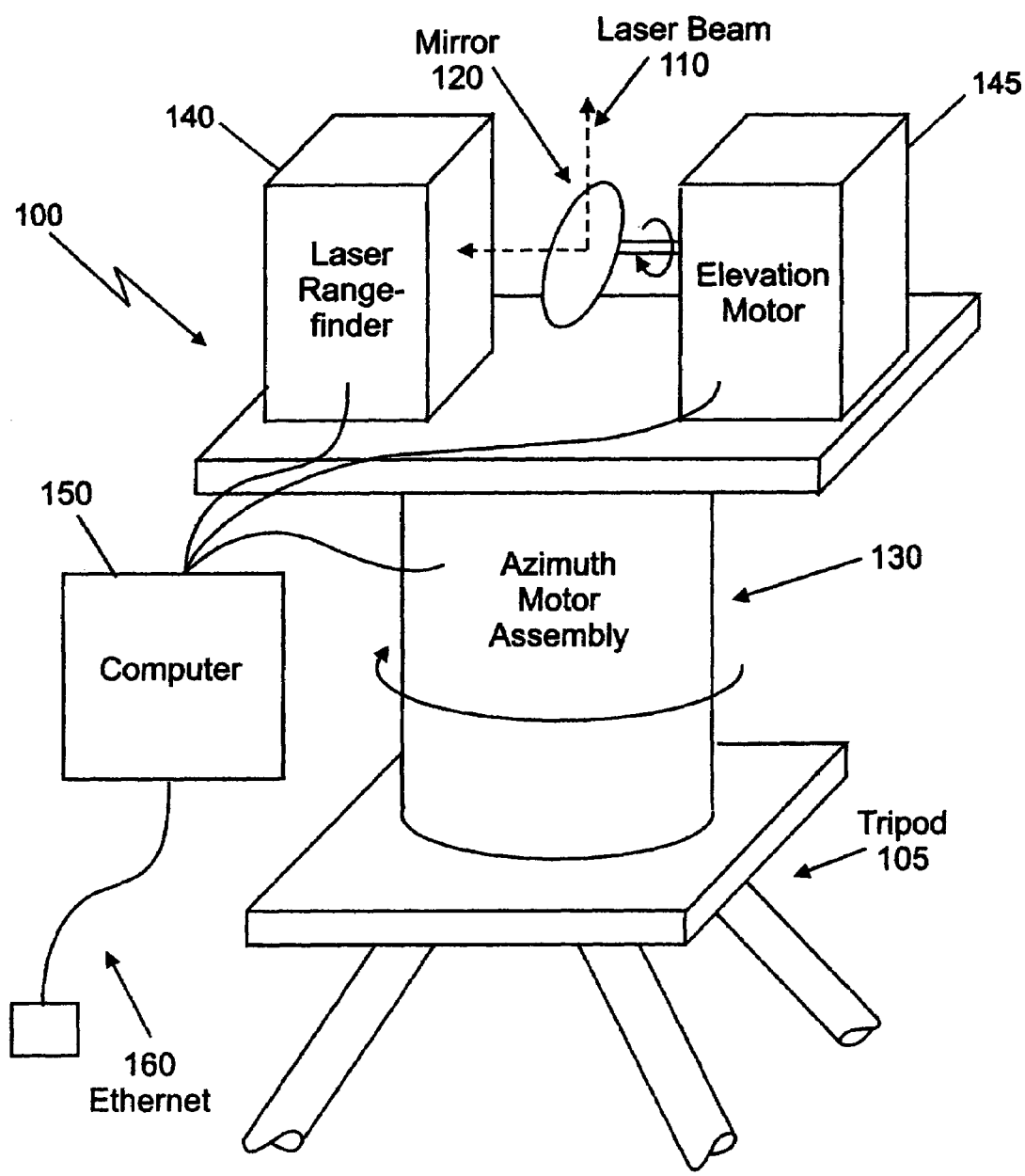
FIG. 1 is a diagram illustrating a conventional 3D scanning laser rangefinder.

The present invention now will be described more fully hereinafter with reference to the accompanying illustrative figures, in which various embodiments of the invention are shown. This invention may, however, be embodied in many different forms and should not be construed as limited to the embodiments set forth herein. Rather, these embodiments are provided so that this disclosure of the present invention will be thorough and complete, and will fully teach and describe the invention to those skilled in the art. Although specific terms are employed herein, they are used in a generic and descriptive sense only and not for purposes of limiting the scope of the present invention as defined by the attached claims in any way. Some terminology may be defined herein and used to describe forthcoming embodiments of the present invention, in order to teach the present invention to those skilled in the art. Terms not described explicitly in this disclosure should be construed as they would by those skilled in the art. Unless otherwise expressly limited, all terms used herein including technical and scientific terms, whether defined herein or not, are intended to have the broadest possible meaning as understood by one of ordinary skill in the art. It will be further understood that terms not explicitly defined herein should be interpreted as having the broadest possible meaning or meanings found in commonly used dictionaries, consistent with their meaning in the context of the relevant art. Some terms will be explicitly defined herein and used to describe embodiments of the present invention to those skilled in the art. Terms defined explicitly herein should be interpreted as the broader of their definition herein and their dictionary meanings. These defined terms should accordingly be construed according to their broadest possible meaning to skilled artisans in this field.

The Figures are provided for illustrative purposes, for teaching purposes, and to assist in understanding the present invention, and should not be viewed as precision blueprints or perfectly scaled drawings. In the drawings provided, the dimensions of features or regions may be exaggerated for clarity, readability, or the like. Features in the Figures may not be exactly to scale. The Figures are provided to show example embodiments of the present invention. Thus, embodiments of the present invention should not be construed as limited solely to the particular Figure or Figures illustrated herein but may include variations and deviations from many sources. Like numbers refer to like features or elements throughout. As used herein the term "and/or" includes any and all combinations of one or more of the associated listed items. Further, as used herein the term "at least" includes the number specified plus more than the number specified, unless explicitly limited otherwise.

As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, and/or components, but do not preclude the presence of one or more additional features, steps, operations, elements, components, and/or combinations thereof. Moreover, terms such as "horizontal", "vertical" and "perpendicular" indicate general directions or relationships rather than precise 0° or 90° orientations. Ranges and angles are approximate and are provided merely to teach the invention.

In one embodiment, the present invention provides a method for obtaining the geometric correspondence between at least two 3D range data sets obtained using a 3D rangefinder device. The method comprises at least a number of steps. The method starts by providing a first 3D range data set. Next, the method provides a second 3D range data set. Of course, more 3D range data sets could be provided, either in parallel or serially. The method thereafter includes the step of representing the first 3D range data set as a first 2D displayed image. Of course, the first 3D range data set could be represented as multiple 2D displayed images in different formats. Next, the step of representing the second 3D range data set as a second displayed image selected from the group consisting of a second 2D displayed image and a 3D displayed image is provided. Further, the method includes the step of specifying corresponding features within the first 2D displayed image and within the second displayed image respectively. In addition, the method comprises the step of computing a 3D transformation between the first 3D range data set and the second 3D range data set based on the geometry of the specified corresponding features. As such, the geometric correspondence between the two 3D range data sets is determined. Various other embodiments related to the above are provided.

In embodiments, specifying the corresponding features can comprise a variety of activities. Specifying corresponding features could include manually specifying corresponding points, corresponding lines, corresponding surfaces, corresponding volumes, other corresponding features, the like, and combinations of the preceding. By manually, it is meant that a user interacts with the computer using some I/O (Input/Output) of the many means available for interacting with a computer, such as using a mouse or the like. In addition, specifying corresponding features could include automatically specifying corresponding points, corresponding lines, corresponding surfaces, corresponding volumes, other corresponding features, the like, and combinations of the preceding. By automatically, it is meant that at least some automated data processing is used for interacting with the computer for specifying corresponding features. Of course, any combination of manual specification and automatic specification of corresponding features could be used. For example, specifying corresponding features might comprise using a computer cursor controlled by a mouse, using a computer cursor controlled by a pointing stick, using a computer cursor controlled by a joystick, using a computer cursor controlled by a touch pad, using software to specify, and combinations of the above.

For some embodiments, specifying corresponding features could comprise any of a number of techniques used either individually or in combination. Sub-pixel interpolation in any 2D displayed image may be used, wherein a software tool may allow the user to estimate and specify the location of a feature anywhere within a pixel and not just at its origin. Further, interpolation may be used between measured 3D range data points on surfaces in any 3D displayed image wherein a software tool may allow the user to estimate and specify the location of a feature anywhere upon a surface even if that particular location is not directly associated with a measured 3D range data point. In addition, estimates of the centers of features may be used, wherein the user may estimate and specify the location of the center of a feature even if the particular pixel at that chosen center appears no different from adjacent pixels. Holes and data interpolated across holes could be used wherein the rangefinder device did not acquire a range measurement. A software tool may allow the user to estimate and specify the location of a feature anywhere within a hole even though that particular location is not directly associated with a measured 3D range data point.

The second 3D range data set can be provided in various ways for embodiments. A second 3D range data set may be obtained by the same 3D rangefinder device as the first 3D range data set but obtained from a different 3D location or it could be obtained by the same 3D rangefinder device as the first 3D range data set from the same 3D location but obtained at a different resolution. The second 3D range data set could be obtained by the same 3D rangefinder device as the first 3D range data set from the same 3D location but obtained at a different time. It could also be obtained by a different 3D rangefinder device as the first 3D range data set and obtained at the same 3D location, or it could be obtained by a different 3D rangefinder device as the first 3D range data set and obtained from a different 3D location. Further, the second 3d range data set could be obtained by a different 3D rangefinder device as the first 3D range data set and obtained at a different time.

Also, one or more 3D range data sets used in an embodiment could be represented by at least two displayed images. For some embodiments, at least three 3D range data sets may be provided. In these cases, computing the 3D transformation can be carried out by using computing selected from the group consisting of computing the 3D transformation between at least two 3D range data sets in parallel, computing the 3D transformation between at least two 3D range data sets simultaneously, computing the 3D transformation between at least two 3D range data sets serially, and computing in combinations of the preceding ways of computing.

Many 3D rangefinder devices may be used to provide the first and second 3D range data sets used in numerous embodiments. A scanning laser rangefinder using time of flight range measurement principles, a scanning laser rangefinder using phase comparison range measurement principles, or a scanning laser rangefinder using any other range measurement principles can be used. Further, an imaging laser rangefinder range camera using time of flight range measurement principles, an imaging laser rangefinder range camera using phase comparison range measurement principles, or an imaging laser rangefinder range camera using any other range measurement principles are also possible to use. A triangulation rangefinder, a stereo image rangefinder, a multiple image rangefinder, or any other device that acquires a multiplicity of range data points simultaneously could be used to provide 3D data sets. Also, any other device that acquires a multiplicity of range data points over a period of time can be used, as well as combinations of the above.

For some embodiments, at least one of the first 2D displayed image and the second 2D displayed image may comprise a 2D image. A 2D range image could comprise range values from the 3D rangefinder device converted to monochrome, or range values from the 3D rangefinder device converted to false color. A 2D reflectance image comprising intensity values of the rangefinding signal reflected from a physical surface and thereafter received by the 3D rangefinder device converted to monochrome could be used as a 2D displayed image. Further, a 2D reflectance image comprising intensity values of the rangefinding signal reflected from a physical surface and thereafter received by the 3D rangefinder device converted to false color, or a 2D registered color image comprising a color camera image previously registered with 3D range data are possible 2D displayed images. A 2D registered color image wherein the image is acquired from the same perspective as the 3D range data set, a 2D registered color image wherein the image is acquired from a different perspective than the 3D range data set, or a 2D registered color image wherein the image is acquired with the same resolution as the 3D range data set could be used. In addition, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data could each comprise a 2D displayed image as used in various embodiments.

Analogously, the 3D displayed image may comprise a 3D image selected from the group consisting of a 3D point display, a 3D point display in orthogonal projection, a 3D point display in perspective projection, a 3D polygonal mesh, a 3D polygonal mesh in orthogonal projection, a 3D polygonal mesh in perspective projection, a 3D surface geometry display, a 3D surface geometry display in orthogonal projection, and a 3D surface geometry display in perspective projection.

Those skilled in the art will appreciate that the method embodiments can be implemented in any number of ways. The method could be implemented in a computer processor executing a suitable computer software program product executing therein. Further, the method may be implemented in a suitable computer software program product embodied on computer readable tangible media.

The present invention provides other embodiments. For instance, one embodiment of the invention provides a computer program product stored in computer readable media for execution in at least one processor for obtaining the geometric correspondence between at least two 3D range data sets. The 3D range data sets can be obtained by using a 3D rangefinder device. The computer program product comprises a number of software modules therein. First, a first software module for providing a first 3D range data set, and a second software module for providing a second 3D range data set are included in the computer program product. Further, a third software module for representing the first 3D range data set as a first 2D displayed image is provided. A fourth software module is included for representing the second 3D range data set as a second displayed image selected from the group consisting of a second 2D displayed image and a 3D displayed image. In addition, a fifth software module for specifying corresponding features within the first 2D displayed image and within the second displayed image respectively is provided. The computer program product also provides a sixth software module for computing a 3D transformation between the first 3D range data set and the second 3D range data set based on the geometry of the specified corresponding features. As such, the geometric correspondence between the two 3D range data sets is determined. The present invention also provides other embodiments related to the preceding, and the prior discussion related to the method embodiments applies also to the computer program product embodiments.

The present invention provides an apparatus in yet another embodiment. The apparatus may be used for obtaining the geometric correspondence between at least two 3D range data sets obtained using a 3D rangefinder device. At least one computer processor executing a computer program product within is provided by the apparatus. A number of software modules are included within the computer program product. Thus, a first software module for providing a first 3D range data set is provided. Also, a second software module for providing a second 3D range data set is included in the computer program product. In addition, a third software module for representing the first 3D range data set as a first 2D displayed image is provided. A fourth software module is included for representing the second 3D range data set as a second displayed image selected from the group consisting of a second 2D displayed image and a 3D displayed image. Further, a fifth software module for specifying corresponding features within the first 2D displayed image and within the second displayed image respectively is provided. The computer program product also provides a sixth software module for computing a 3D transformation between the first 3D range data set and the second 3D range data set based on the geometry of the specified corresponding features. As such, the geometric correspondence between the two 3D range data sets is determined. The present invention also provides other embodiments related to the preceding. Further, the prior discussion related to the method embodiments applies also to the apparatus embodiments. Next we discuss more details regarding various embodiments of the present invention.

Figure 4:
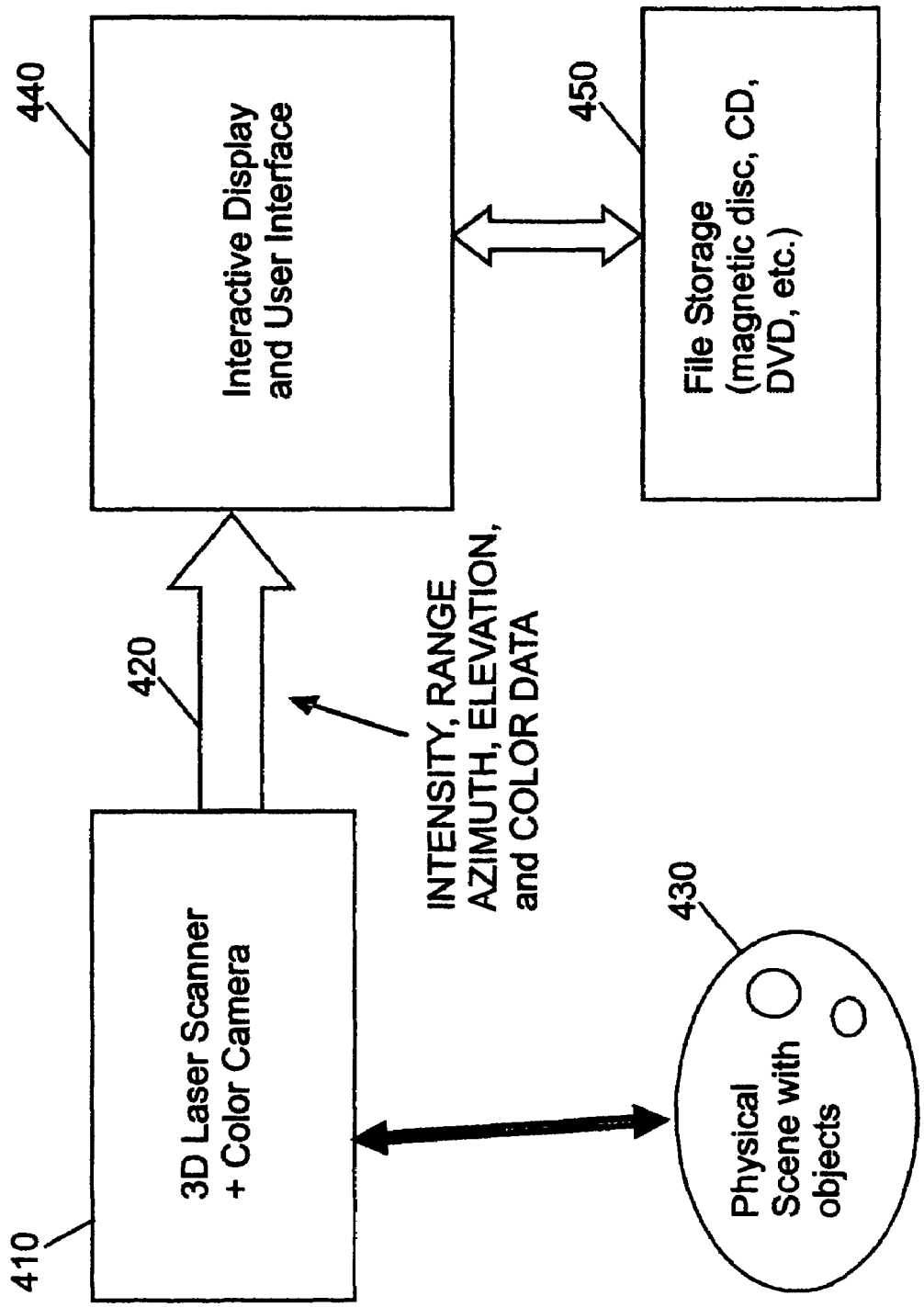
FIG. 4 is a diagram illustrating one example of the acquisition of a 3D range data set.

Referring to FIG. 4, a 3D rangefinder 410 is used to acquire a 3D range data set 420 from a physical object or scene 430. One 3D rangefinder 410 embodiment shown in FIG. 1 is a laser scanning 3D rangefinder 100 comprising a time-of-flight laser rangefinder 140, elevation scanning mirror 120 which is rotated by elevation motor 145, and azimuth rotating motor assembly 130. The 3D rangefinder such as shown in FIG. 1 also includes an embedded computer 150 for interfacing to and controlling the rangefinder 140, elevation motor 145, and azimuth motor 130. The embedded computer 150 communicates with any external computer via Ethernet 160 and also transfers data samples from the rangefinder, performs necessary data processing such as applying calibration tables and passes data samples to the external computer for visualization, storage, and subsequent processing.

We see that in FIG. 4, the 3D range data set 420 for each data sample comprising intensity, range, azimuth, and elevation values is transferred to an external computer and presented in a computer display 440 for evaluation and control of laser scanning parameters such as resolution and speed. The data is simultaneously stored in a computer file 450 for later processing and display.

Two or more 3D range data sets 420 are typically acquired using the laser scanning 3D rangefinder 410 located at different locations around the scene. Other techniques for acquiring multiple 3D data sets 420 may be used including using the same rangefinder 410 at different times or at different resolutions and using two or more different 3D rangefinders 410. The operator must take care that there is some area of the scene that is overlapped by two or more acquisition scans so that a subsequent registration step may be readily performed.

Figure 5:
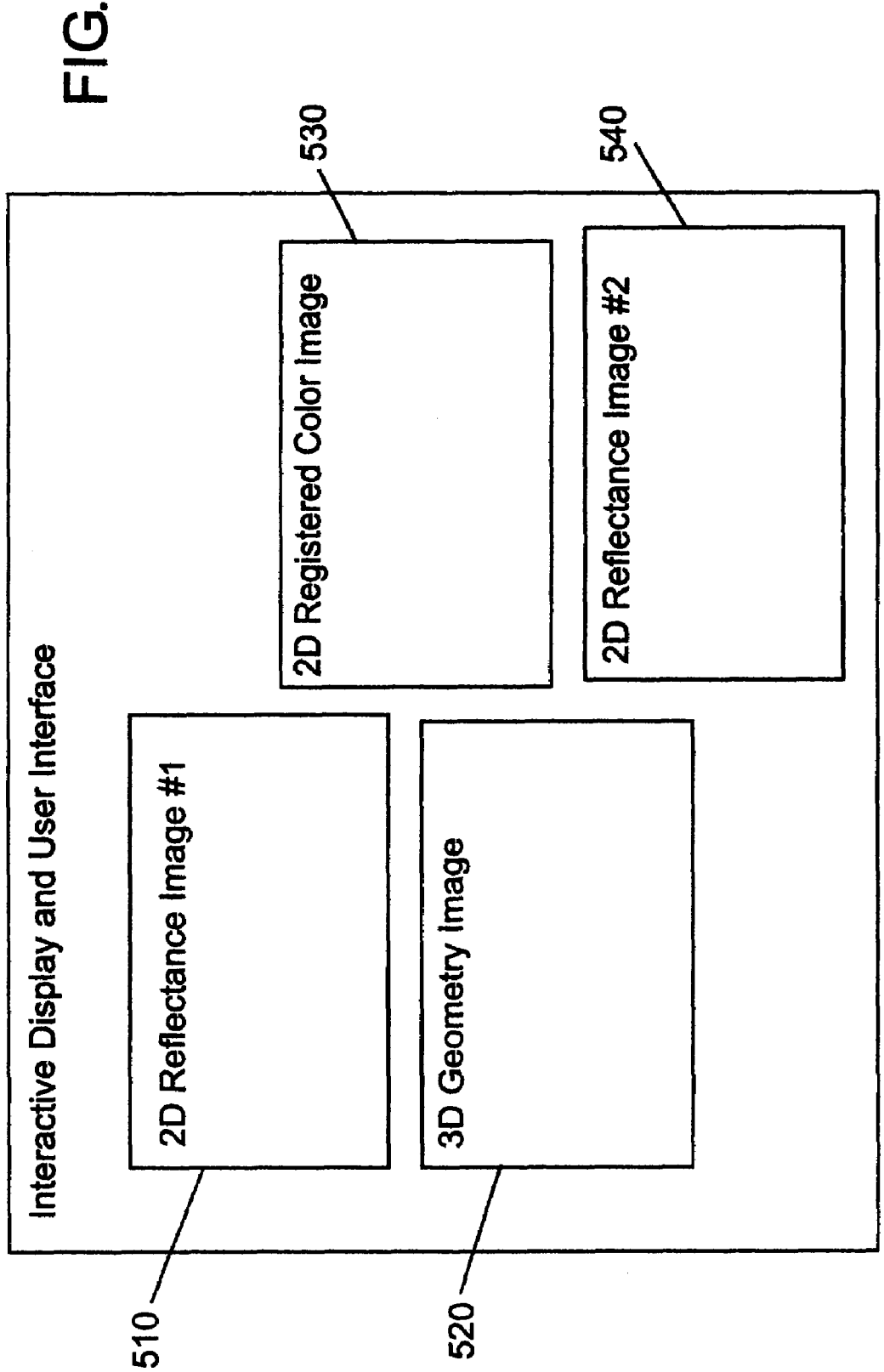
FIG. 5 is a diagram illustrating an example display of multiple images representing two 3D range data sets, according to some embodiments of the present invention.

After acquisition of the 3D range data sets 420 from a physical scene such as 430 with objects, the next step is registering the multiple data sets. First each data set to be registered is presented to a user via a computer display. The user may select from multiple formats which may be used for displaying this data as shown in FIG. 5. As an example, data from the first 3D data set is represented in windows 510, representing a 2D reflectance image for example, and 520, representing a 3D geometric image on the display screen while data from the second 3D data set is represented in windows 530 and 540 on the display screen. Window 540 may represent 2D reflectance image #2, and window 530 can represent a 2D registered color image, for example.

A 3D displayed image format such as 520 is one in which the user may select a particular 3D viewpoint and then view the 3D range data as geometric figures in perspective projection or in orthogonal projection or via some other projection. Techniques for displaying collections of 3D data are well known from computer graphics textbooks such as "Computer Graphics: Principles and Practice in C" by James D. Foley, Andries van Dam, Steven K. Feiner, and John F. Hughes (Addison Wesley 1995). The display may represent range data samples as 3D points (also known as a point cloud) which may all be colored a single color, which may have false color assigned to each point based on its range, which may have color assigned to each point based on the intensity of the reflected laser beam, or colored via any other scheme. In another 3D display technique, the 3D range data points may be linked together into a displayed mesh using well known computer graphics techniques, such that neighboring points are connected via lines within the display. The lines of the mesh may be colored using any of the techniques discussed above using well-known computer graphics techniques. In another 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

Figure 2:
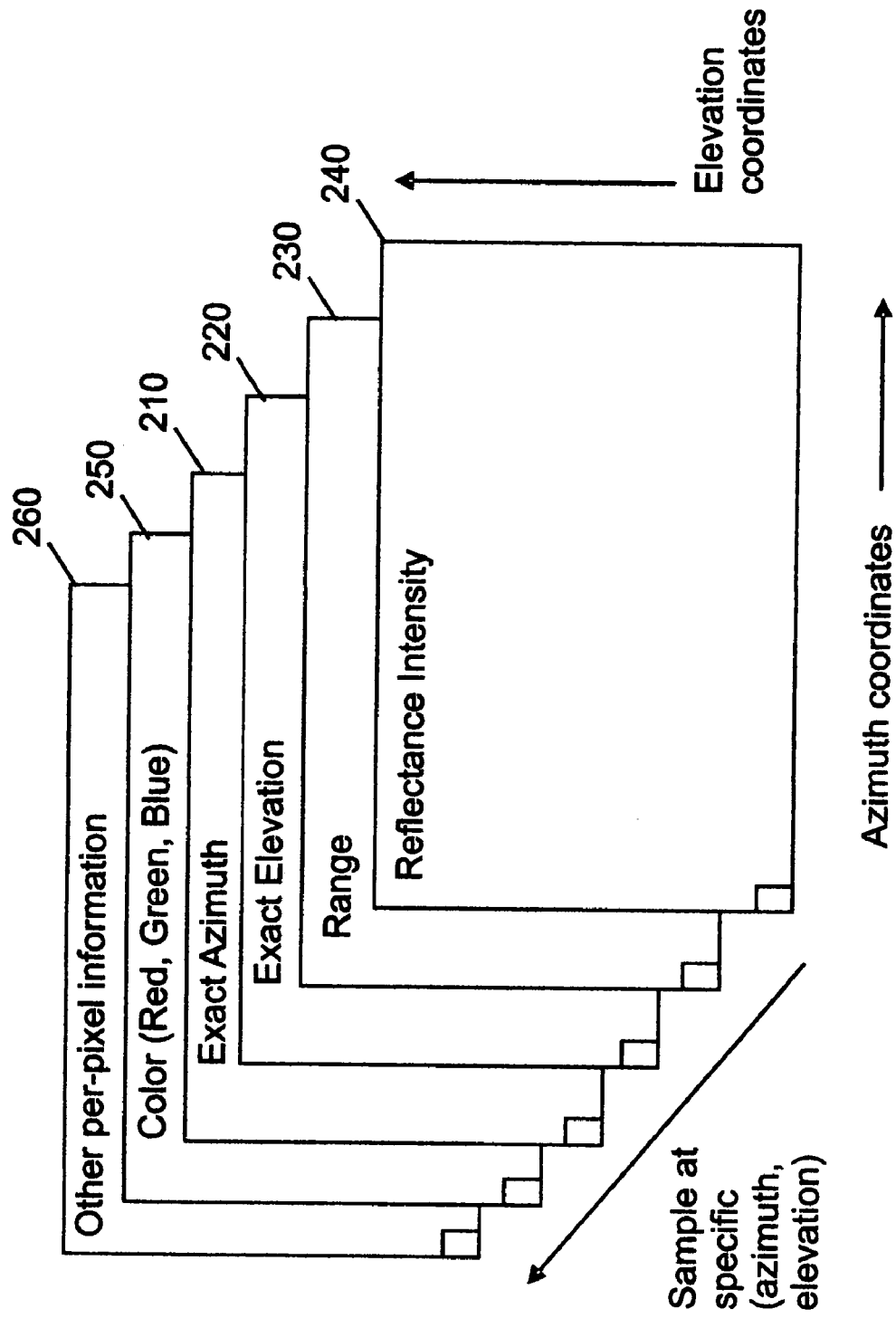
FIG. 2 is a diagram illustrating multiple example values that could be associated with a pixel within a 2D image representing a 3D range data set.
Figure 3:
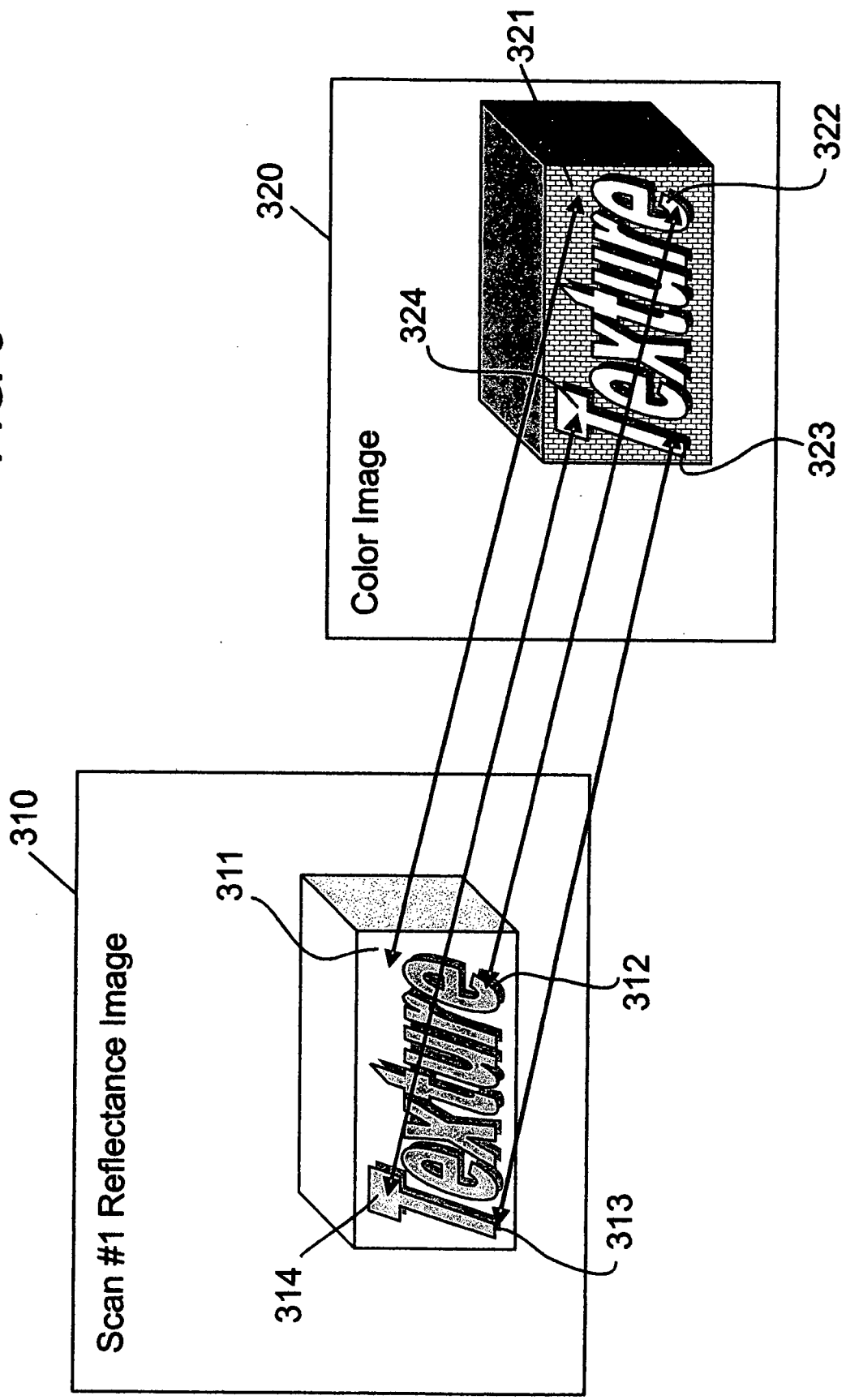
FIG. 3 is a diagram illustrating corresponding range and color information for a registered color image representing a 3D range data set.

A 2D displayed image format such as 510, 530, or 540 is one in which the 3D data set is represented as a 2D image. There are many well-known techniques for doing this since the data from typical 3D rangefinder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as vertical or Y axis on the display, and each pixel represents one or more 3D data points depending on the scale chosen. The 2D displayed image need not be represented in spherical projection, but in any other well-known projection of a 3D data set to a 2D display. As illustrated in FIG. 2, each pixel may have a multiplicity of associated values stored with it, including precise azimuth angle value 210, precise elevation angle value 220, range value 230, reflectance value 240, color 250 (RGB), and any other useful values 260. The color of each pixel with in the 2D displayed image may be determined in any of a number of well-known formats. A Range Image has a false color assigned to each pixel based on its range. A Reflectance Image such as 510 or 540 has a color assigned to each pixel based on the intensity of the reflected laser beam. A Registered Color Image such as 530 has a color assigned to each pixel based on the color obtained from a color sensor such as a 2D digital camera such that the range data and color data are aligned as shown in FIG. 3.

Figure 6:
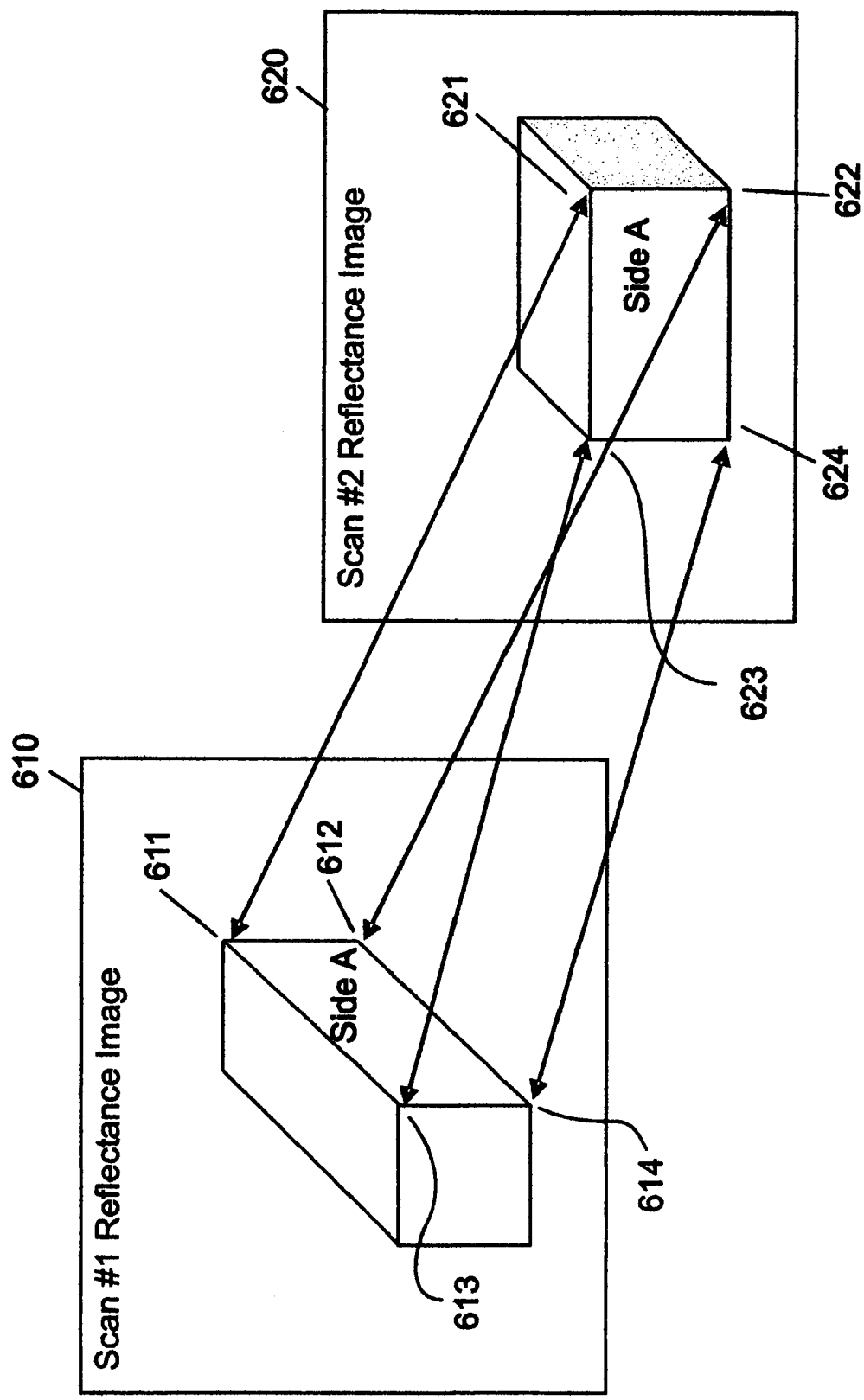
FIG. 6 is a diagram illustrating corresponding pairs of features within two 3D range data sets, according to some embodiments of the present invention.

Having accomplished the steps of acquiring the multiple 3D data sets as illustrated in FIG. 4 and displaying them as illustrated in FIG. 5, the user next performs the step of identifying corresponding features within the images representing the multiple data sets as illustrated in FIG. 6.

The user specifies features in images by identifying a particular pixel within a 2D or 3D displayed image which will allow the calculation of the X, Y, and Z coordinates of the data represented by that pixel. As shown in FIG. 6, the user might use a mouse or other control device to position a cursor such as a crosshairs over a desired pixel 611 within a 2D reflectance image 610. Since the azimuth 210, elevation 220, and range 230 values for a 3D range sample are associated with the pixel, simple trigonometry can be used to convert from spherical to Cartesian coordinates and obtain the corresponding X, Y, and Z values. In an additional feature specification technique, the image might be zoomed in so that an image data pixel covers a 10×10 array of pixels on the screen. In that case, the cursor could be used to indicate a sub-pixel location to within 0.1 pixel and more accurate X, Y, and Z values can be readily interpolated based on the sub-pixel location and azimuth, elevation, and range values associated with neighboring pixels. In a related additional feature specification technique a point on a 3D surface might be selected with a cursor and then the X, Y, and Z values may be calculated by interpolating between the actual 3D range data points that define the surface. In another feature specification technique, the method can be extended to cover holes and data interpolated across holes. As used herein, holes are places where the scanner did not acquire a range measurement because of insufficient returned laser energy or other reasons. An interactive or automated software tool may allow the user to estimate and specify the location of a feature point anywhere within a hole even though that particular location is not directly associated with a measured 3D range data point. For example the user may interactively or automatically estimate and specify the location of the center of a circular hole in a 2D or 3D displayed image. Calculation of the bi-linear, bi-cubic, or other interpolation of surrounding measured range data points can then yield the estimated feature point location.

The user selects a first feature 611 in a first 2D displayed image 610 representing a first 3D range data set using the technique discussed above. Then the user selects a corresponding feature 621 in a second 2D displayed image 620 using the above techniques. In an alternative technique, the user may select one set of feature points within a first 2D displayed image representing the first 3D data set and then select corresponding features within a 3D displayed image representing the second 3D range data set. Rather than being restricted to solely using 3D displayed images for the crucial step of identifying corresponding features as in current methods, the invention allows the user a wide range of data representations to choose from, making the process easier, more accurate, and more natural. The user next proceeds to select as many pairs of features such as 612 and 622, 613 and 623, and 614 and 624, as desired as input to the step of calculating the 3D transformation between two range data sets.

A minimum of three non-collinear pairs of corresponding 3D (X, Y, Z) points is needed to calculate the desired 3D rigid transformation using well-known techniques to solve for 3 rotation angles plus 3 translations, including those disclosed for example in O. D. Faugeras and M. Hebert "The representation, recognition, and locating of 3-d objects", International Journal of Robotic Research, 5(3):27-52, Fall 1986. More points may be used along with well-known least-squares minimization techniques to obtain a better fit, as disclosed for example in K. Arun, T. Huang, and S. Blostein, "Least-Squares Fitting of Two 3D Point Sets", in IEEE Transactions on Pattern Analysis and Machine Intelligence, vol. 9 (1987), 698-700. Also the initial sets of corresponding features may be used as the starting points for algorithms such as the iterated closest point technique disclosed in P. J. Besl and N. D. McKay, "A Method for Registration of 3-D Shapes", IEEE Transactions on Pattern Analysis and Machine Intelligence, Vol. 14 (1992), No. 2, 239-256. Additional references to registration techniques which might be used are given in Fausto Bernardini and Holly Rushmeier, "The 3D Model Acquisition Pipeline" Volume 21 (2002), number 2 pp. 149-172 COMPUTER GRAPHICS forum.

Corresponding features need not be 3D points but may be any feature such as a circle or sphere which can be readily identified by the user and for which an X, Y, Z coordinate may be determined. Similarly, any corresponding linear features such as edges which can be readily identified by the user may be used. Similarly any corresponding features such as corners and traffic cones for which a position and orientation may be determined and which can be readily identified by the user can be used. Similarly any corresponding surfaces such as planes which can be readily identified by the user may be used. For example, a user might specify corresponding regions of two 3D data set representing the ceiling and two adjacent walls of a room. Well-known mathematical techniques can then be used to compute the 3D transformation based on the three corresponding pairs of planes.

Figure 7:
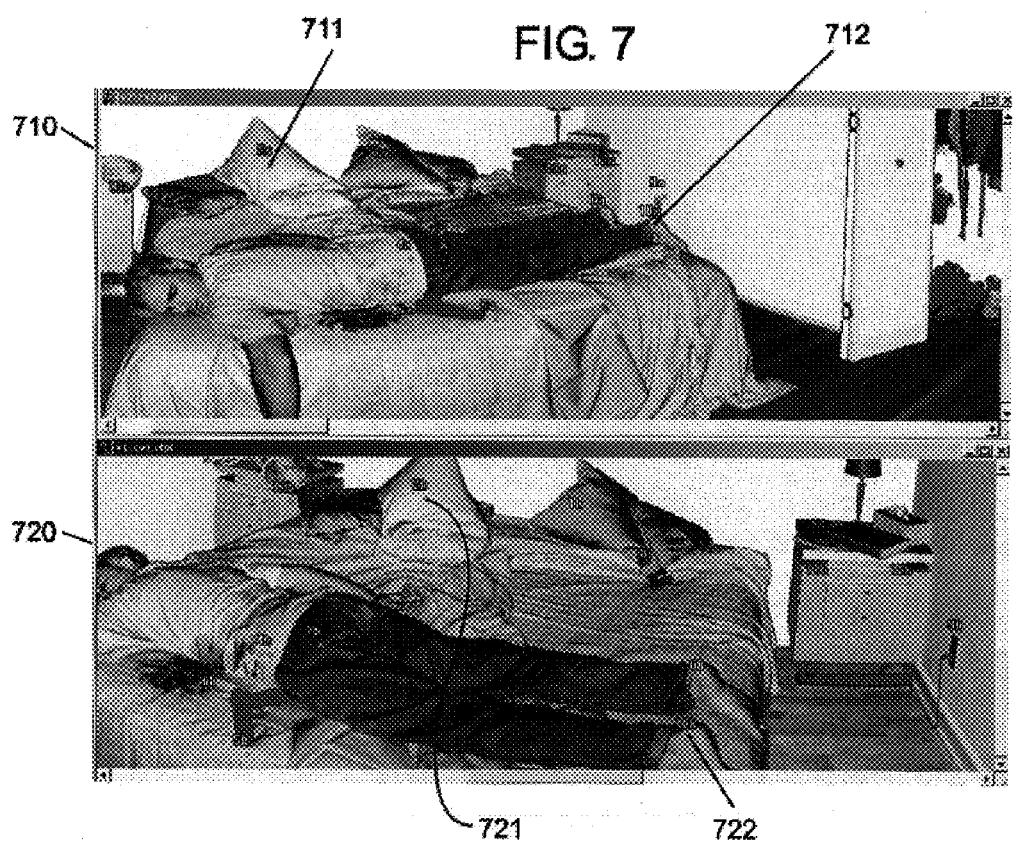
FIG. 7 is a diagram illustrating two 2D reflectance images representing two different 3D range data sets and illustrating the specification of corresponding features within the 3D range data sets, according to some embodiments of the present invention.
Figure 8:
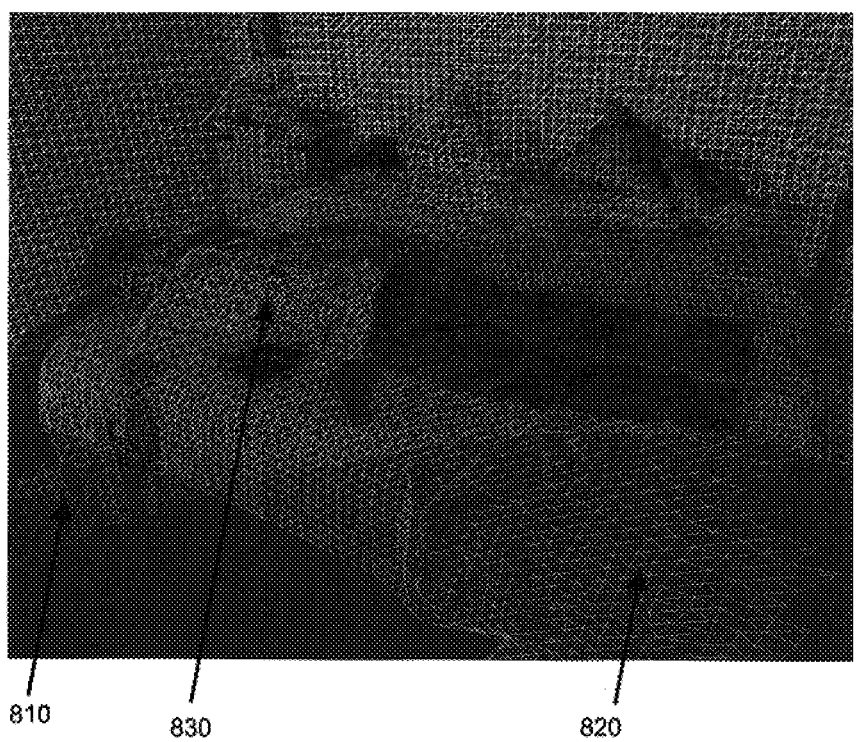
FIG. 8 is a diagram illustrating a 3D displayed image illustrating the results of registering two different 3D range data sets, according to some embodiments of the present invention.

The process of specifying corresponding feature points is illustrated in FIG. 7. In this Figure the reflectance image representations of two 3D data sets are shown in images 710 and 720. As can clearly be seen from the images, the first 3D data set as represented in reflectance image 710 was acquired from a viewpoint near the head of the (simulated) murder victim and the second 3D data set as represented in reflectance image 720 was acquired from a viewpoint near the victim's feet. Multiple pairs of corresponding features such as pair 711 and 721, and pair 712 and 722 have been identified and are marked within the image. The result of using the X, Y, Z coordinates of each of these features to compute a 3D transformation is illustrated in FIG. 8 where a combined 3D display of the two 3D range data sets is presented. The two 3D range data sets are now represented as 3D meshes to aid in presentation and each has been transformed into a common coordinate frame with a new viewpoint located at a location from which neither 3D range data set was acquired. In the area of the floor 810, only data from the second 3D range data set is present, and in the area of the lower bed 820 only data from the first 3D range data set is present. In other areas such as the torso 830, data from both 3D range data sets overlap correctly as a result of the registration process.

Thus it can be seen that embodiments of the present invention can address problems noted above. As such, embodiments provide an improvement upon existing methods which rely on specifying corresponding features within confusing and often-ambiguous 3D point displays. The embodiments provide a natural, easy-to-use method of specifying correspondences for registration of multiple 3D range data sets that allow one to obtain a more complete coverage of a scene or object.

Many modifications and other embodiments of the invention will come to mind to one skilled in the art to which this invention pertains having the benefit of the teachings presented in the foregoing descriptions and the associated figures. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limiting the scope of the present invention in any way.

What is claimed is:

1. A method for obtaining the geometric correspondence between at least two 3D range data sets obtained using a 3D rangefinder device, comprising:

acquiring a first 3D range data set by using a first 3D rangefinder device to scan a scene and generate the first 3D range data set, wherein the first 3D range data set includes, for each pixel, at least three measured dimension values;

acquiring a second 3D range data set by using one of the first 3D rangefinder device and a second 3D rangefinder device to scan the scene and generate the second 3D range data set, wherein the second 3D range data set includes, for each pixel, at least three measured dimension values;

representing the first 3D range data set as a first 2D displayed image;

representing the second 3D range data set as a second displayed image selected from the group consisting of a second 2D displayed image and a 3D displayed image;

specifying corresponding features within the first 2D displayed image and within the second displayed image respectively; and computing a 3D transformation between the first 3D range data set and the second 3D range data set based on the geometry of the specified corresponding features, such that the geometric correspondence between the two 3D range data sets is determined.

2. The method of claim 1, wherein specifying corresponding features comprises at least one of manually specifying corresponding points, manually specifying corresponding lines, manually specifying corresponding surfaces, manually specifying corresponding volumes, manually specifying corresponding other features, automatically specifying corresponding points, automatically specifying corresponding lines, automatically specifying corresponding surfaces, automatically specifying corresponding volumes, automatically specifying corresponding other features, and combinations thereof.

3. The method of claim 1, wherein specifying corresponding features comprises at least one technique selected from the group consisting of using sub-pixel interpolation in any 2D displayed image wherein a software tool may allow the user to estimate and specify the location of a feature anywhere within a pixel and not just at its origin, using interpolation between measured 3D range data points on surfaces in any 3D displayed image wherein a software tool may allow the user to estimate and specify the location of a feature anywhere upon a surface even if that particular location is not directly associated with a measured 3D range data point, using estimates of the centers of features wherein the user may estimate and specify the location of the center of a feature even if the particular pixel at that chosen center appears no different from adjacent pixels, and using holes and data interpolated across holes wherein the rangefinder device did not acquire a range measurement and wherein a software tool may allow the user to estimate and specify the location of a feature anywhere within a hole even though that particular location is not directly associated with a measured 3D range data point.

4. The method of claim 1, wherein where the second 3D range data set may be obtained from the group consisting of being obtained by the same 3D rangefinder device as the first 3D range data set but obtained from a different 3D location, being obtained by the same 3D rangefinder device as the first 3D range data set from the same 3D location but obtained at a different resolution, being obtained by the same 3D rangefinder device as the first 3D range data set from the same 3D location but obtained at a different time, being obtained by a different 3D rangefinder device as the first 3D range data set and obtained at the same 3D location, being obtained by a different 3D rangefinder device as the first 3D range data set and obtained from a different 3D location, and being obtained by a different 3D rangefinder device as the first 3D range data set and obtained at a different time.

5. The method of claim 1, wherein at least one of the first 3D range data set and the second 3D range data set are provided by a 3D rangefinder device selected from the group consisting of a scanning laser rangefinder using time of flight range measurement principles, a scanning laser rangefinder using phase comparison range measurement principles, a scanning laser rangefinder using any other range measurement principles, an imaging laser rangefinder range camera using time of flight range measurement principles, an imaging laser rangefinder range camera using phase comparison range measurement principles, an imaging laser rangefinder range camera using any other range measurement principles, a triangulation rangefinder, a stereo image rangefinder, a multiple image rangefinder, any other device that acquires a multiplicity of range data points simultaneously, and any other device that acquires a multiplicity of range data points over a period of time and combinations of the above.

6. The method of claim 1, wherein at least one of the first 2D displayed image and the second 2D displayed image comprises a 2D image selected from the group consisting of a 2D range image comprising range values from the 3D rangefinder device converted to monochrome, a 2D range image comprising range values from the 3D rangefinder device converted to false color, a 2D reflectance image comprising intensity values of the rangefinding signal reflected from a physical surface and thereafter received by the 3D rangefinder device converted to monochrome, a 2D reflectance image comprising intensity values of the rangefinding signal reflected from a physical surface and thereafter received by the 3D rangefinder device converted to false color, a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data.

7. The method of claim 1, wherein the 3D displayed image comprises a 3D image selected from the group consisting of a 3D point display, a 3D point display in orthogonal projection, a 3D point display in perspective projection, a 3D polygonal mesh, a 3D polygonal mesh in orthogonal projection, a 3D polygonal mesh in perspective projection, a 3D surface geometry display, a 3D surface geometry display in orthogonal projection, and a 3D surface geometry display in perspective projection.

8. The method of claim 1, implemented in a computer processor executing a suitable computer software program product therein.

9. The method of claim 1, implemented in a suitable computer software program product embodied on computer readable tangible media.

10. The method of claim 1, wherein specifying corresponding features comprises at least one of using a computer cursor controlled by a mouse, using a computer cursor controlled by a pointing stick, using a computer cursor controlled by a joystick, using a computer cursor controlled by a touch pad, using software to specify, and combinations of the above.

11. The method of claim 1, wherein at least one 3D range data set is represented by at least two displayed images.

12. The method of claim 1, wherein at least three 3D range data sets are provided and wherein computing the 3D transformation is carried out using computing selected from the group consisting of computing the 3D transformation between at least two 3D range data sets in parallel, computing the 3D transformation between at least two 3D range data sets simultaneously, computing the 3D transformation between at least two 3D range data sets serially, and combinations of the preceding.

13. A computer program product stored in computer readable media for execution in at least one processor, the processor having access to at least two 3D range data sets obtained using a 3D rangefinder device, comprising:
a first software module for acquiring a first 3D range data set generated using a first 3D rangefinder device to scan a scene, wherein the first 3D range data set includes, for each pixel, at least three measured dimension values, and for providing the first 3D range data set to the at least one processor;
a second software module for acquiring a second 3D range data set generated using one of the first 3D rangefinder device and a second 3D rangefinder device to scan the scene and generate the second 3D range data set, wherein the second 3D range data set includes, for each pixel, at least three measured dimension values, and for providing the second 3D range data set to the at least one processor;
a third software module for representing the first 3D range data set as a first 2D displayed image;
a fourth software module for representing the second 3D range data set as a second displayed image selected from the group consisting of a second 2D displayed image and a 3D displayed image;
a fifth software module for specifying corresponding features within the first 2D displayed image and within the second displayed image respectively; and
a sixth software module for computing a 3D transformation between the first 3D range data set and the second 3D range data set based on the geometry of the specified corresponding features, such that the geometric correspondence between the two 3D range data sets is determined.

14. The computer program product of claim 13, wherein at least one of the first 2D displayed image and the second 2D displayed image comprises a 2D image selected from the group consisting of a 2D range image comprising range values from the 3D rangefinder device converted to monochrome, a 2D range image comprising range values from the 3D rangefinder device converted to false color, a 2D reflectance image comprising intensity values of the rangefinding signal reflected from a physical surface and thereafter received by the 3D rangefinder device converted to monochrome, a 2D reflectance image comprising intensity values of the rangefinding signal reflected from a physical surface and thereafter received by the 3D rangefinder device converted to false color, a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data.

15. The computer program product of claim 13, wherein at least one 3D range data set is represented by at least two displayed images.

16. The computer program product of claim 13, wherein at least three 3D range data sets are provided and wherein computing the 3D transformation is carried out using computing selected from the group consisting of computing the 3D transformation between at least two 3D range data sets in parallel, computing the 3D transformation between at least two 3D range data sets simultaneously, computing the 3D transformation between at least two 3D range data sets serially, and combinations of the preceding.

17. An apparatus having access to at least two 3D range data sets obtained using a 3D rangefinder device, comprising:
at least one computer processor;
a computer program product executing within the at least one computer processor, wherein the computer program product further comprises at least the following software modules therein;
a first software module for acquiring a first 3D range data set generated using a first 3D rangefinder device to scan a scene, wherein the first 3D range data set includes, for each pixel, at least three measured dimension values, and for providing the first 3D range data set to the at least one processor;
a second software module for acquiring a second 3D range data set generated using one of the first 3D rangefinder device and a second 3D rangefinder device to scan the scene and generate the second 3D range data set, wherein the second 3D range data set includes, for each pixel, at least three measured dimension values, and for providing the second 3D range data set to the at least one processor;
a third software module for representing the first 3D range data set as a first 2D displayed image;
a fourth software module for representing the second 3D range data set as a second displayed image selected from the group consisting of a second 2D displayed image and a 3D displayed image;
a fifth software module for specifying corresponding features within the first 2D displayed image and within the second displayed image respectively; and a sixth software module for computing a 3D transformation between the first 3D range data set and the second 3D range data set based on the geometry of the specified corresponding features, such that the geometric correspondence between the two 3D range data sets is determined.

18. The apparatus of claim 17, wherein at least one of the first 2D displayed image and the second 2D displayed image comprises a 2D image selected from the group consisting of a 2D range image comprising range values from the 3D rangefinder device converted to monochrome, a 2D range image comprising range values from the 3D rangefinder device converted to false color, a 2D reflectance image comprising intensity values of the rangefinding signal reflected from a physical surface and thereafter received by the 3D rangefinder device converted to monochrome, a 2D reflectance image comprising intensity values of the rangefinding signal reflected from a physical surface and thereafter received by the 3D rangefinder device converted to false color, a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data.

19. The apparatus of claim 17, wherein at least one 3D range data set is represented by at least two displayed images.

20. The apparatus of claim 17, wherein at least three 3D range data sets are provided and wherein computing the 3D transformation is carried out using computing selected from the group consisting of computing the 3D transformation between at least two 3D range data sets in parallel, computing the 3D transformation between at least two 3D range data sets simultaneously, computing the 3D transformation between at least two 3D range data sets serially, and combinations of the preceding.

21. The method of claim 1 wherein the at least three measured dimension values for each pixel include range, azimuth, and elevation.

22. The computer program product of claim 13 wherein the at least three measured dimension values for each pixel include range, azimuth, and elevation.

23. The apparatus of claim 17 wherein the at least three measured dimension values for each pixel include range, azimuth, and elevation.

24. The method of claim 1 comprising generating, based on the 3D transformation, a combined 3D display of the first and second 3D range data sets.

25. The method of claim 24 wherein generating the combined display includes generating the combined display from a view point located at a location from which neither the first or second 3D range data sets were acquired.

* * * * *